Jan. 23, 1973   W.C. HAMSHERE ET AL   3,712,795
METHOD FOR SAMPLING PLANT FLUIDS
Original Filed Oct. 11, 1967

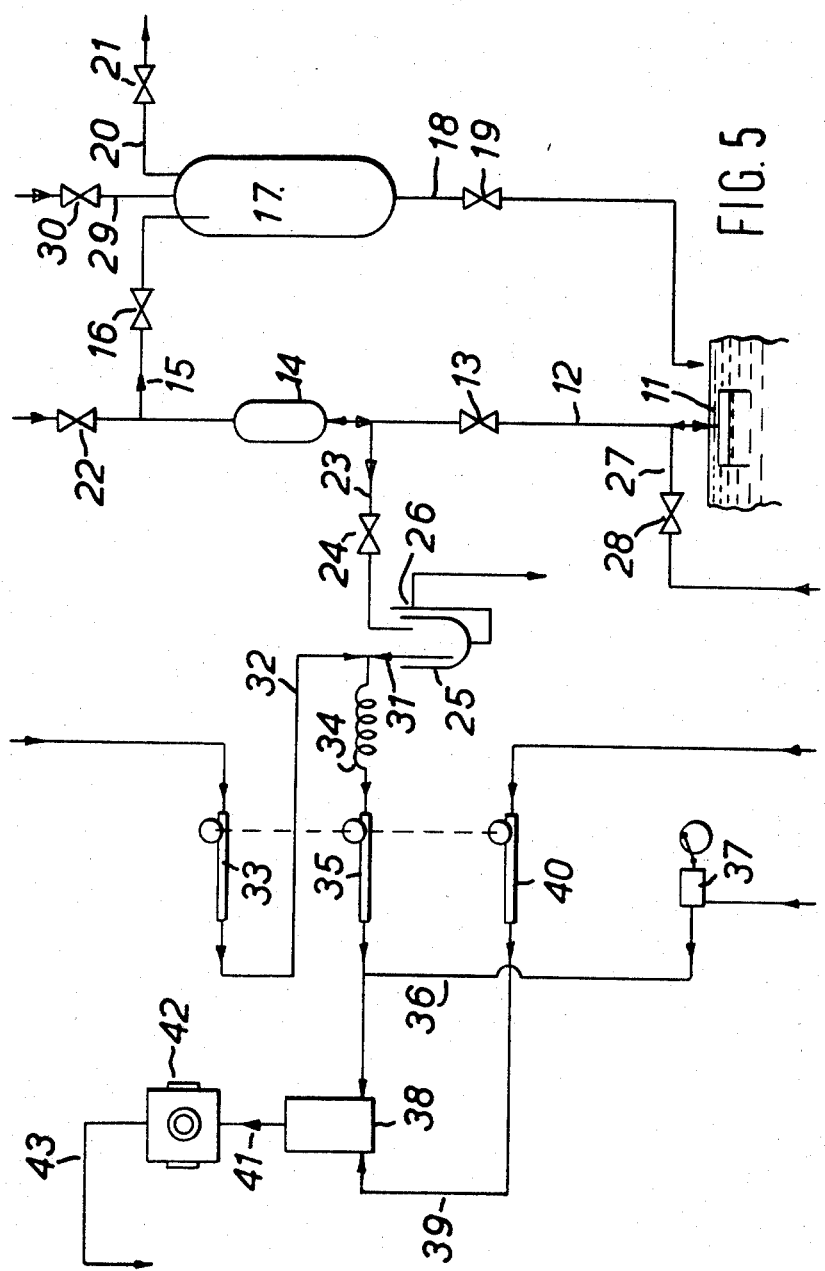

United States Patent Office 3,712,795
Patented Jan. 23, 1973

3,712,795
METHOD FOR SAMPLING PLANT FLUIDS
Wilfred Charles Hamshere, Holmrook, and Thomas William Lancaster Atkinson, Whitehaven, England, assignors to Marchon Products Limited, London, England
Original application Oct. 11, 1967, Ser. No. 674,495. Divided and this application Feb. 3, 1971, Ser. No. 112,382
Claims priority, application Great Britain, Oct. 14, 1966, 46,171/66
Int. Cl. B01d 23/24; G01n 21/02, 21/26
U.S. Cl. 23—230 R        8 Claims

ABSTRACT OF THE DISCLOSURE

An automatic method for the sampling of plant fluid containing suspended fine solids to provide a substantially continuous supply of clear fluid for analysis. The composition of the fluid is substantially continuously monitored. The process comprises (A) repeatedly and sequentially (i) withdrawing a sample stream of fluid from the plant; (ii) filtering said sample stream, whereby a filter cake accumulates and the filtered sample stream is initially cloudy and subsequently becomes clearer as the filter cake accumulates; (iii) isolating the clearer portion of the filter sample to obtain clear sample fluid; (iv) dispersing the filter cake by backwashing; (B) collecting successively isolated portions of said clear sample fluid to provide a supply of clear freshly filtered fluid in a holding vessel; (C) simultaneously, and substantially continuously, withdrawing fluid from the supply in said holding vessel; and (D) analysing said withdrawn fluid.

---

Figure 1:
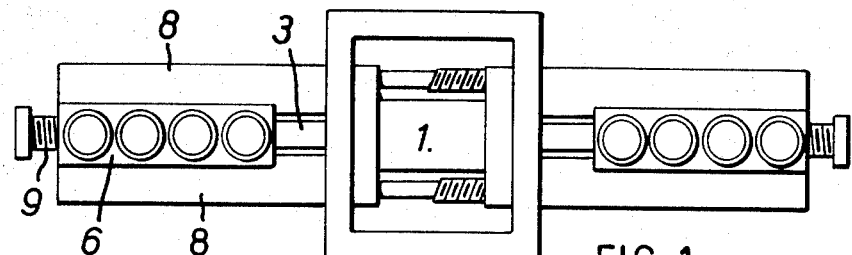

This application is a divisional application of Ser. No. 674,495, which issued as U.S. Pat. No. 3,582,284 on June 1, 1971.

The present invention provides improvements in or relating to the control of chemical processes. The invention is especially applicable to industrial processes in which several different streams of corrosive fluids must be controlled simultaneously.

An example of such a process is the analysis of plant liquids such as the mixture of phosphoric acid and gypsum obtained during the manufacture of wet process phosphoric acid, in order to determine sulphate ion concentration. Various methods have been proposed for such analyses, e.g. in U.S. Pat. 2,979,385, which suggests taking a continuously cycled stream of sample from a wet process phosphoric acid reactor, passing it through a filter and intermittently diverting a part of the sample stream through a needle valve into a mixing tank where it is admixed with barium chloride solution. The intensity of a beam of light shone through the mixture is compared with that of a beam of light shone through the original barium chloride solution, to provide a measure of the turbidity due to precipitated barium sulphate.

This process has been found impracticable for various reasons. A major defect is the tendency of the barium sulphate to accumulate, blocking lines and obscuring the windows of the turbidimetric cell.

A further problem, one often encountered in processes which involve the continuous withdrawal of a sample through a filter, is the tendency of fine solid to penetrate the filter in the early stages of filtration, and of accumulated filter cake to clog the filter and inhibit the flow of liquid during the later stages.

A particular problem which has also been encountered in practice and which often occurs when it is necessary to sample, automatically, liquids from one or more stages in a chemical plant, which liquids may be of a corrosive nature or may contain abrasive solids in suspension, is the unsatisfactorily short life of the valves commonly available for such purposes. Needle valves of the type specified in U.S. Pat. 2,979,385 have been found totally unsuitable, since they are too readily corroded.

We have now discovered a system for sampling and analysing plant fluids and for controlling their flow which is particularly applicable to the automatic regulation of sulphate ion concentration in wet process phosphoric acid and can readily be adapted to a variety of other problems of sampling and fluid control in chemical engineering.

We have discovered that chemical plant liquids containing suspended solids may be automatically sampled and obtained substantially free from solids, in a form suitable for continuous monitoring, by withdrawing liquid through a filter, and passing the filtered liquid through a sample vessel until the liquid in the sample vessel is sufficiently clear. The flow may then be halted and the liquid in the sample vessel transferred to a holding vessel, while the filter is backwashed. The sequence is then repeated. The sample for analysis may be withdrawn continuously from the holding vessel.

We have also discovered that continuous analysis for sulphate by turbidimetric techniques may be effectively carried out by passing a metred flow of sample (which may be diluted, if necessary to aid pumpability by mixing with a metred flow of water) to a mixing chamber adapted to inhibit deposition of barium sulphate, wherein the sample is admixed with a metred flow of an aqueous solution containing barium ions. The mixed solutions are continually passed through a turbidimetric cell wherein they are illuminated from a suitable source, and the ratio of the light transmitted through the liquids to the light scattered therefrom is measured by means, for example, photoelectric cells.

We have discovered further that the automatic sampling of chemical plant materials may be conveniently carried out employing a modified pinch valve, that is a valve of the type in which an elastic tube is constricted.

Our invention accordingly provides a method of sampling fluids from chemical plants which comprises:

(A) repeatedly performing a sequence of operations consisting of withdrawing fluid from the plant through a filter, passing the filtered fluid through a sample vessel until the fluid in the sample vessel is clear, halting the flow of fluid, transferring the clear fluid from the sample vessel to a holding vessel and backwashing the filter; and (B) continuously or intermittently withdrawing fluid from the holding vessel for analysis.

Preferably the fluid which passes through the sample vessel before the flow is halted is ultimately returned to the plant. For example, the fluid may be passed to a reservoir, which may be connected to a vacuum line to induce the withdrawal of sample fluid through the filter. When the flow is halted, the fluid in the reservoir may be returned to the plant.

Conveniently the transfer of fluid from the sample vessel to the holding vessel and from the reservoir to the plant is effected by pressure of compressed air.

Preferably the holding vessel is small compared with the sample vessel, and is conveniently adapted to ensure that each batch of sample transferred from the sample vessel flushes any residue of the preceding batch from the holding vessel. For example a U pipe may have a short arm connected to the bottom of the holding vessel and a longer arm whose upper extremity defines the maximum level of liquid in the holding vessel. The excess liquid may be allowed to overflow the upper extremity of the longer arm and pass into a drain.

Preferably the sizes of the holding and sample vessels and the rate of withdrawal of fluid from the holding vessel are such as to ensure that there is always fluid in the holding vessel, and desirably the fluid is continuously withdrawn from the holding vessel at a constant rate.

Where the sample is a saturated or near saturated solution, it may be desirable to maintain the holding vessel and/or the sample vessel at a temperature sufficient to inhibit deposition of solids. Preferably all the valves required in the sampling system are pinch valves in which an elastic tube is compressed to prevent the flow of fluid. Conveniently all the valves which are simultaneously closed are actuated by a common automatically regulated pinch mechanism.

According to a particular embodiment, our invention provides a method for continuously determining sulphate ion concentration in aqueous chemical plant solutions which comprises passing a metred flow of the solution substantially free of suspended solid, and a metred flow of an aqueous solution containing barium ions, to a mixing vessel adapted to inhibit adherence of barium sulphate thereto, passing the mixed solution through a turbidimetric cell, illuminating the liquid in the cell and determining the ratio of the light transmitted through the solution to the light scattered therefrom.

Preferably the sample liquid is diluted with a metered flow of water before admixture with the aqueous barium solution. In particular, where viscous, corrosive or saturated solutions are involved e.g. wet process phosphoric acid saturated with gypsum, it is frequently desirable to dilute the sample with a metred flow of water before passing the sample through a metering pump. In this way corrosion, or the blocking of pumps and lines with precipitated solids may be reduced.

Preferably the sample liquid is withdrawn from the holding vessel of the sampling system of our invention as hereinbefore described.

The mixing vessel is adapted to prevent deposition of barium sulphate. This may be most conveniently achieved by constructing the vessel of a material to which barium sulphate does not readily adhere e.g. polytetrafluoroethylene. Alternatively the vessel may be provided with suitable agitation, e.g. ultrasonic vibration, to inhibit deposition of sulphate. Preferably the vessel is large enough in relation to the flow rate to provide a residence time of from 10 to 100 seconds to ensure complete precipitation of sulphate.

The turbidimetric cells preferably comprises four windows positioned to enable two beams of light to be passed through the cell, intersecting therein making an angle which is preferably substantially 90°. In a preferred form of cell the two beams of light shine alternately and a single photoelectric cell alternately measures the intensity of the light transmitted by one beam and that of the light scattered by the other beam. Conveniently the two beams are supplied by a single source using a suitable optical system. Preferably a characteristic pattern of interruption is superimposed on each beam e.g. by means of a rotating chopper. In this way the beams may be electronically distinguished. The ratio between intensities of scattered and transmitted light provides a convenient measure of the amount of suspended barium sulphate in the solution which is independent of any effect due to barium sulphate deposited on the windows. The output from the turbidmetre may be used to regulate such operating parameters as sulphuric acid feed rate, for example using the control techniques of the prior art.

In contrast to prior methods for turbidimetric determination of sulphate we have found that no gel forming or stabilizing additives or wetting agents are required for our method.

Our invention provides a valve consisting of a plurality of sets of constrictable tubes, each set being provided with constricting means capable of constricting all the tubes in the set simultaneously, together with an automatic control mechanism whereby the constricting means are sequentially activated.

According to a preferred embodiment our invention provides a valve which comprises a first set of at least two elastic tubes, a second set of at least one elastic tube and means for constricting, alternately, all the tubes of the first set, and all the tubes of the second set, the constriction of each tube being sufficient to inhibit or prevent any flow of fluid therein. Preferably the constricting means comprises a reciprocating piston provided with a double ended rod each end of which drives a pinch bar. The piston may, for example, be driven by means of a double acting hydraulic or pneumatic cylinder. For example, the tubes of each set may be arranged parallel to one another in the same plane as, and perpendicular to, the piston rod, one set at either end. Preferably each tube is separated from the next by a floating pinch bar which is free to slide along the axis of the piston rod. In this way all the tubes of either set may be compressed against a suitable end stop as the piston nears the end of a stroke. Where fluids of high pressure are involved it may be convenient to employ a system of levers connecting the piston rod to the pinch bar or bars.

Our invention also provides an apparatus for sampling plant fluids which comprises a filter, a first line adapted to withdraw sample fluid through the filter and then through a first valve to a sample vessel, a second line adapted to pass fluid from the sample vessel through a second valve to a reservoir, a third line adapted to pass fluid from the sample vessel through a third valve to a holding vessel, a fourth line provided with a fourth valve adapted to discharge fluid from the reservoir, a vacuum line provided with a fifth valve and connecting with the reservoir, a water line adapted to supply water through a sixth valve to the first line at a point between the filter and the first valve, and two compressed air lines provided respectively with seventh and eighth valves and connecting respectively with the reservoir and with a part of the apparatus between the first and second valves, the first, second and fifth valves constituting a first set, and the third, fourth, sixth, seventh and eighth valves constituting a second set, and means adapted to close simultaneously all the valves of the first set while opening all the valves of the second set, and vice versa.

Preferably the valves consist of constrictable tubes and each set is opened and closed by the action of a common constricting member, for example by a system of pinch bars as hereinbefore described. Preferably the filter is in the form of a filter probe adapted to be positioned within a chemical reactor. When the valves of the first set are open, fluid is drawn by the vacuum line through the filter probe, the first line, the sample vessel and the third line to the reservoir. When the valves of the second set are open, water from the second line backwashes the filter and helps to clear any solid deposited in the first line, liquid from the sample vessel is transferred through the fourth line to the holding vessel by air pressure, and liquid in the reservoir is discharged through the fifth line.

Figure 2:
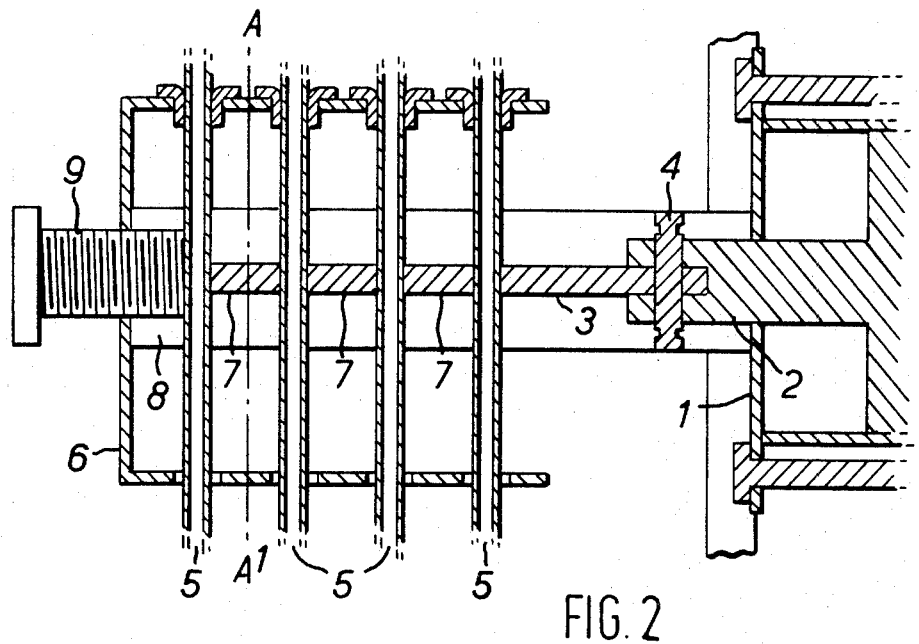
Figure 3:
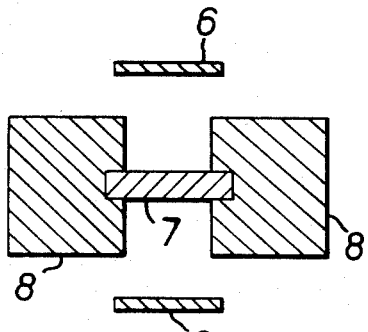
Figure 4:
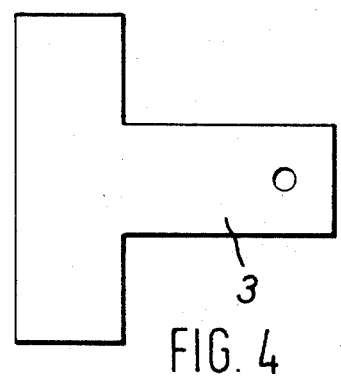

A particular form of valve according to the invention will now be described with reference to FIGS. 1 to 4 of the accompanying drawings, of which FIG. 1 is a plan view of the valve, FIG. 2 is a sectional elevation showing the means for constricting one set of tubes, FIG. 3 is a cross-section along the line A—A, and FIG. 4 is a plan view of the driven pinch bar.

The valve comprises a double acting pneumatic cylinder 1 whose double ended piston rod 2 is attached at either end to a T-shaped, driven pinch bar 3 by means of a pin 4. Parallel elastic tubes 5 are supported in the same plane as, and perpendicular to, the rod 2, at either end thereof. The tubes are supported by the brackets 6. The tubes are separated from one another by floating pinch bars 7. The driven pinch bar 3 and the floating pinch bars 7 are free to slide in the grooves of guide bars 8. At either end of the valve is an adjustable end stop 9.

The flow of fluid to the double acting cylinder 1 may be automatically controlled by a solenoid operated four way pilot valve not shown. The compressed air is admitted to one end of the cylinder the piston moves to the end of its stroke and the driven pinch bar 3 compresses the first of the tubes 5 against the first of the floating pinch bars 7. This pressure is transmitted along the series of tubes and floating pinch bars thereby compressing the last of the tubes 5 against the adjustable end stop 9. On admitting compressed air to the other end of the cylinder the piston moves back and the pressure of fluid in the tubes together with their elasticity causes the floating pinch bars to resume their original position. The number of tubes at either end may be varied and the position of the end stop 9 adjusted accordingly.

It is preferred to use valves according to the invention for the automatic sampling of materials in a chemical plant. For example, fluid material withdrawn from the plant, reagent fluids required for analysis and wash water may each be passed through separate constrictable tubes. The flow of each fluid is controlled by the constriction of the relevant tube, constriction being regulated automatically to ensure the correct sequence for example by suitable pneumatic, hydraulic or electrical regulators.

A valve of the type specifically described with reference to FIGS. 1 to 4 of the accompanying drawings has been tried successfully for the automatic sampling of corrosive fluids, and found to have a life substantially greater than any of the commercially available valves tried.

A particular embodiment of our invention, adapted for continuous analysis of the sulphate ion concentration in a wet process phosphoric acid reactor, and emobdying a valve as hereinbefore described with reference to FIGS. 1 to 4 of the accompanying drawings will now be described with reference to FIG. 5 of the accompanying drawings, which is a flow sheet illustrating the sampling and analytical systems.

The apparatus comprises a filter probe 11 and a line 12 (which is preferably constructed of polytetrafluoroethylene) provided with a valve 13 and adapted to convey fluid from the filter probe to a sample vessel 14. A line 15 provided with a valve 16 is adapted to convey fluid from the sample vessel to a reservoir 17. A line 18 provided with a valve 19 is adapted to discharge fluid from the reservoir. The reservoir is connected with a vacuum line 20 provided with a valve 21.

A line 23 provided with a valve 24 is adapted to transfer fluid from the sample vessel to a holding vessel 25 the bottom of which is drained by the shorter arm of a U tube 26, whose longer arm is provided with an overflow which determines the maximum level of liquid in the holding vessel.

A water supply line 27 provided with a valve 28, connects with the line 12 between the valve 13 and the filter probe. Compressed air is supplied to the line 15 through a valve 22 at a point between the sample vessel and the valve 16. A compressed air line 29 provided with a valve 30 connects with the reservoir.

The valves 13, 16, and 21 constitute a first set of constrictable tubes held in one arm of a valve mechanism as hereinbefore described with reference to FIGS. 1 to 4 of the accompanying drawings. Valves 19, 22, 24, 28 and 30 constitute a second set of constrictable tubes held in the other arm of the valve mechanism.

A line 31 is adapted to withdraw liquid from near the bottom of the holding vessel, and leads via a mixer 34 and a metering pump 35 to a mixing chamber 38 which is preferably constructed of polytetrafluoroethylene. Water supply lines (32 and 36) provided respectively with metering pumps (33 and 37) join the line 31 respectively at a point between the holding vessel and the mixer 34 and a point between the metering pumps 35 and the mixing chamber 38. A line 39 provided with a metering pump 40 is adapted to supply barium chloride solution to the mixing chamber.

A line 41 leads from the mixing chamber to the cell of a Southern Analytical Ltd. A 1690 suspended solids recorder 42, whence a line 43 leads to waste.

The following parametres were found applicable to the control of sulphate ion in a wet process phosphoric acid reactor:

Vessels

| | Mls. |
|---|---|
| Capacity of sample vessel 14 | 30 |
| Capacity of reservoir 17 | 2000 |
| Capacity of holding vessel 25 | 7 |

Valves

An automatic regulator maintained the first set open for 105 seconds and the second set open for 15 seconds.

Pressures

| | |
|---|---|
| Valve 22 | Air at 1 p.s.i. |
| Valve 30 | Air at 5 p.s.i. |
| Valve 28 | Water at 20 p.s.i. |

Pumps

| | Mls./hr. |
|---|---|
| Flow rate of pump 33 | 150 |
| Flow rate of pump 35 | 300 |
| Flow rate of pump 37 | 24,000 |
| Flow rate of pump 40 | 500 |

An inch diameter cell having a capacity of 20 mls. was employed. The filter probe was of stainless steel having a terylene filter cloth held in position by a 2 inch skirt. A small glass coil was employed as the mixer 34. Provision was made to maintain the holding vessel at the same temperature as the plant reaction vessel.

The apparatus was assembled with the filter probe 11 within a wet process phosphoric acid reactor and the line 19 discharging back into the reactor.

With the first set of valves open, liquid was drawn through the filter probe to the reservoir 17 until sufficient filter cake had accumulated to clarify the filtrate. With the second set of valves open the clear liquid in the sample vessel 14 was transferred to the holding vessel 25 where the excess flushed out the residue of the previous discharge, the liquid in the reservoir 17 was returned to the reactor, and the filter was backwashed.

A change of sulphate ion concentration in the reactor was registered within 5 minutes and the system was found capable of providing close and accurate control over the reaction.

We claim:

1. An automatic method for the sampling of plant fluid containing suspended fine solids to provide a substantially continuous supply of clear fluid for analysis, whereby the composition of the fluid may be substantially continuously monitored which comprises
   (A) repeatedly and sequentially
       (1)
           (i) withdrawing a sample stream of fluid from the plant;
           (ii) filtering said sample stream, whereby a filter cake accumulates on the filter and the filtered sample stream is initially cloudy and subsequently becomes clearer as the filter cake accumulates;
           (iii) isolating the clearer portion of the filtered sample to obtain clear sample fluid;
       (2) backwashing said filter between sequential withdrawals of sample streams of fluid to disperse said filter cake;
   (B) collecting said clear sample fluid in a holding vessel;
   (C) simultaneously, and substantially continuously, withdrawing fluid from the supply in said holding vessel; and (D) analysing said withdrawn fluid whereby substantially continuous monitoring of the composition of the fluid in the plant is obtained.

2. A method according to claim 1 wherein the proportion of fluid isolated in each cycle is larger than the proportion retained as the supply in the holding vessel, and the excess is used to flush away the residual supply from the previous cycle.

3. An automatic method for the determination of the concentration of sulphate ions in aqueous chemical plant fluid which contains fine solids in suspension comprising
(A) repeatedly and sequentially
  (1)
    (i) withdrawing a sample stream of sulphate ion containing fluid which also contains fine suspended solids from the plant;
    (ii) filtering said sample stream, whereby a filter cake accumulates on the filter and the filtered sample stream is initially cloudy and subsequently becomes clearer as the filter cake accumulates;
    (iii) isolating the clearer portion of the filtered sample to obtain clear sample fluid;
  (2) backwashing said filter between sequential withdrawals of sample streams of fluid to disperse said filter cake;
(B) collecting said clear sample fluid in a holding vessel;
(C) withdrawing fluid from the supply in said holding vessl for analysis;
(D) admixing a constant metered amount of said withdrawn fluid with a constant metered amount of a standard solution containing barium ions to form a mixture thereof; and
(E) determining the sulphate ion concentration of said mixture.

4. The method of claim 3 wherein said fluid is withdrawn from said supply in said holding vessel substantially continuously and wherein said withdrawn fluid is analysed substantially continuously whereby substantially continuous determination of the concentration of sulphate ions in the chemical plant fluid is obtained.

5. The method of claim 4 wherein the step of dispersing the filter cake by back-washing (A) (iv) and the step of collecting an isolated portion of said clear sample fluid in a holding vessel (B) are carried out substantially simultaneously and wherein the proportion of fluid isolated in each cycle is larger than the proportion retained as the supply in the holding vessel, and the excess is used to flush away the residual supply from the previous cycle.

6. The method of claim 5 wherein said mixture is introduced into a turbidimetric cell wherein the concentration of sulphate ion is determined by illuminating the mixture in said cell and measuring the ratio of the intensity of light transmitted through the mixture to that of the light scattered therefrom.

7. The method of claim 6 wherein said clear filtrate and said barium ion containing solution are admixed in a chamber which is lined with solid poly tetra.

8. The method of claim 6 wherein said clear filtrate and said barium ion containing solution are admixed in a chamber and wherein the mixture is agitated by ultrasonic vibration to inhibit deposition of sulphate on the walls of said mixing chamber.

References Cited
UNITED STATES PATENTS

| | | | |
|---|---|---|---|
| 2,873,644 | 2/1959 | Kremen et al. | 356—206 X |
| 2,979,385 | 4/1961 | Karasek et al. | 23—253 R |
| 3,137,543 | 6/1964 | Barton et al. | 23—230 R |
| 3,253,431 | 5/1966 | Minhinnett | 210—411 X |

MORRIS O. WOLK, Primary Examiner

R. M. REESE, Assistant Examiner

U.S. Cl. X.R.

23—230 A, 253 A; 210—82; 356—208